(12) United States Patent
Yu et al.

(10) Patent No.: US 9,960,632 B2
(45) Date of Patent: May 1, 2018

(54) METHOD AND APPARATUS FOR CONTROLLING BOOSTER CIRCUIT AND APPARATUS FOR EXTRACTING MAXIMUM POWER BY USING THE SAME

(71) Applicants: Samsung Electronics Co., Ltd., Gyeonggi-do (KR); Korea Advanced Institute of Science and Technology, Daejeon (KR)

(72) Inventors: Je-in Yu, Seoul (KR); Gyu-hyeong Cho, Daejeon (KR); Kyu-sub Kwak, Seoul (KR); Hui-dong Gwon, Daejeon (KR); June-hyeon Ahn, Gyeonggi-do (KR); Young-sub Yuk, Daejeon (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 34 days.

(21) Appl. No.: 14/641,742

(22) Filed: Mar. 9, 2015

(65) Prior Publication Data
US 2015/0263621 A1 Sep. 17, 2015

(30) Foreign Application Priority Data
Mar. 12, 2014 (KR) .................. 10-2014-0029257

(51) Int. Cl.
*H02J 7/35* (2006.01)
*G05F 1/67* (2006.01)

(52) U.S. Cl.
CPC .................. *H02J 7/35* (2013.01); *G05F 1/67* (2013.01); *Y02E 10/58* (2013.01)

(58) Field of Classification Search
CPC .............. H02M 3/158; H02J 7/35; G05F 1/67
See application file for complete search history.

(56) References Cited

U.S. PATENT DOCUMENTS

| 5,867,011 A | 2/1999 | Jo et al. | |
|---|---|---|---|
| 2010/0066582 A1* | 3/2010 | Park ........................ | H03M 1/52 341/158 |
| 2011/0101953 A1* | 5/2011 | Cheng ..................... | H02M 1/44 323/311 |
| 2013/0018607 A1* | 1/2013 | Jin .......................... | H02S 50/10 702/60 |
| 2013/0147462 A1* | 6/2013 | Lee ....................... | G01R 23/005 324/76.41 |
| 2013/0193942 A1* | 8/2013 | Ishii ...................... | H02M 3/156 323/282 |

(Continued)

OTHER PUBLICATIONS

Trishan Esram et al., "Comparison of Photovoltaic Array Maximum Power Point Tracking Techniques", IEEE Transactions on Energy Conversion, Jun. 2007.

(Continued)

*Primary Examiner* — Adolf Berhane
*Assistant Examiner* — Bart Iliya
(74) *Attorney, Agent, or Firm* — The Farrell Law Firm, P.C.

(57) ABSTRACT

Disclosed are a method and apparatus for controlling a booster circuit such that maximum power is extracted from a power supply while power consumption for monitoring power generated by the power supply is reduced, and an apparatus for extracting maximum power by using the method and apparatus for controlling a booster circuit.

13 Claims, 6 Drawing Sheets

(56) References Cited

U.S. PATENT DOCUMENTS

2013/0249440 A1* 9/2013 Doshi .................... H05B 37/02
                                                              315/309
2015/0180339 A1* 6/2015 Chen ..................... H02M 3/156
                                                              323/235

OTHER PUBLICATIONS

Noppadol Khaehintung et al., "FPGA Implementation of MPPT Using Variable Step-Size P&O Algorithm for PV Applications", ISCIT, 2006.
Saurav Bandyopadhyay et al., "Platform Architecture for Solar, Thermal, and Vibration Energy Combining with MPPT and Single Inductor".
IEEE Journal of Solid-State Circuits, Sep. 2012.

* cited by examiner

МЕТHOD AND APPARATUS FOR CONTROLLING BOOSTER CIRCUIT AND APPARATUS FOR EXTRACTING MAXIMUM POWER BY USING THE SAME

PRIORITY

This application claims priority under 35 U.S.C. 119(a) to Korean Patent Application No. 10-2014-0029257, filed on Mar. 12, 2014 in the Korean Intellectual Property Office, the contents of which are incorporated herein by reference.

BACKGROUND OF THE INVENTION

1. Field of the Invention

The present invention relates generally to a method and apparatus for controlling a booster circuit and an apparatus for extracting maximum power using the booster circuit, and more particularly, to a method and apparatus for controlling a booster circuit connected to a power supply such that maximum power is extracted from the power supply and an apparatus for extracting maximum power by using the booster circuit.

2. Description of the Related Art

As energy consumption has rapidly increased relative to limited energy resources, the likelihood of an energy crisis has also increased. Accordingly, there is now a heightened interest in next-generation energy sources to replace existing energy resources.

Energy harvesting is an example of a technology for generating the next-generation energy sources. Energy harvesting refers to harvesting ambient energy that would otherwise be discarded, by converting this ambient energy into available electrical energy for use. Examples of energy sources for energy harvesting include vibration, light, heat, and electromagnetic waves.

Solar cells, which generate electrical energy by using solar energy, require circuits for tracking a maximum power point because a maximum amount of power that is harvested varies with such factors as an amount of light incident on a solar cell, and temperature of the solar cell. In order to use such power that is harvested according to application for batteries, there is a need in the art for converting circuits of solar cells, for boosting or bucking generated voltage.

SUMMARY OF THE INVENTION

The present invention has been made to address the above mentioned disadvantages, and to provide at least the advantages described below.

Accordingly, an aspect of the present invention is to provide a method of controlling a booster circuit such that maximum power is extracted from a power supply while power consumption for monitoring power generated by the power supply is reduced.

An aspect of the present invention includes an apparatus for controlling a booster circuit such that maximum power is extracted from a power supply while power consumption for monitoring power generated by the power supply is reduced.

An aspect of the present invention includes an apparatus for extracting maximum power using the method and apparatus for controlling a booster circuit.

According to an aspect of the present invention, an apparatus for controlling a booster circuit connected to a power supply includes a detector that detects a first output voltage including information regarding power that is generated by the power supply; a comparing unit that adjusts a second output voltage which determines a duty ratio of the booster circuit according to a result of comparing voltage values to which different duty ratios are applied in the detected first output voltage; and a pulse width modulator that adjusts a duty ratio of the booster circuit based on the adjusted second output voltage.

According to an aspect of the present invention, a method of controlling a booster circuit connected to a power supply includes detecting a first output voltage including information regarding power that is generated by the power supply; adjusting a second output voltage which determines a duty ratio of the booster circuit according to a result of comparing voltage values to which different duty ratios are applied in the detected first output voltage; and adjusting a duty ratio of the booster circuit based on the adjusted second output voltage.

According to an aspect of the present invention, an apparatus for extracting maximum power includes a power supply that generates power; a booster circuit that boosts voltage that is input from the power supply; and an apparatus for controlling a booster circuit, the apparatus adjusting a duty ratio of the booster circuit, wherein the apparatus for controlling the booster circuit adjusts the duty ratio of the booster circuit by comparing voltage values to which different duty ratios are applied in a first output voltage including information regarding power that is generated by the power supply.

BRIEF DESCRIPTION OF THE DRAWINGS

These and/or other aspects, features and advantages will become apparent and more readily appreciated from the following description of the embodiments, taken in conjunction with the accompanying drawings in which.

DETAILED DESCRIPTION OF EMBODIMENTS OF THE INVENTION

Figure 1:
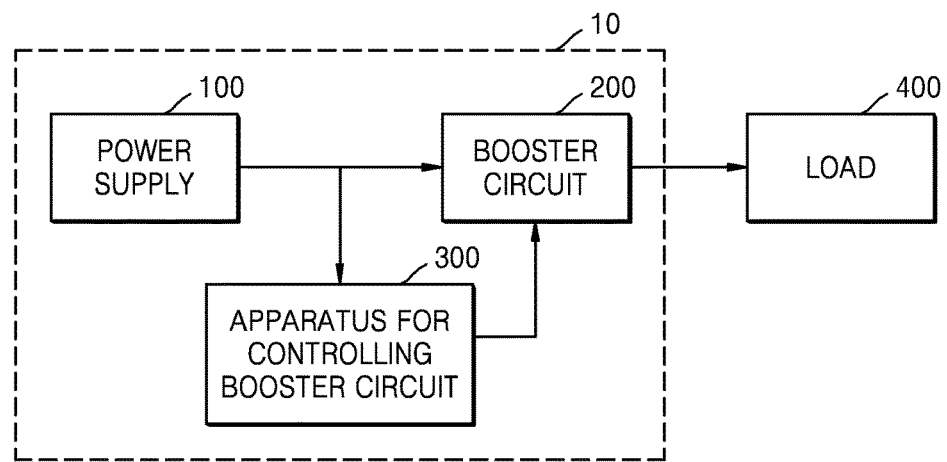
FIG. 1 is a block diagram of an apparatus for extracting maximum power according to an embodiment of the present invention.

The present invention will be described with reference to the accompanying drawings. In the drawings, the same or similar elements are denoted by the same reference numerals even though they are depicted in different drawings. In the following description, a detailed description of known functions and configurations incorporated herein will be omitted for the sake of clarity and conciseness.

It will be understood that terms such as "composed of," "include," and "comprise" do not necessarily include all stated components or steps. Some of the stated components or steps may not be included, or additional components or steps could be further included.

While such terms as "first" and "second" are used to describe various components, such components must not be limited to the above terms. The above terms are used only to distinguish one component from another.

FIG. 1 is a block diagram of an apparatus 10 for extracting maximum power according to an embodiment of the present invention.

Referring to FIG. 1, the apparatus 10 for extracting maximum power is connected to a load 400 and includes a power supply 100, a booster circuit 200, and an apparatus 300 for controlling the booster circuit 200. One of ordinary skill in the art will appreciate that the apparatus 10 for extracting maximum power may further include other general-purpose components alternatively or in addition to the components of FIG. 1.

The power supply 100 generates power from energy sources such as vibration, light, heat, and electromagnetic waves. For example, the power supply 100 is a solar cell which generates electrical energy from solar energy.

The booster circuit 200 boosts a voltage that is input from the power supply 100. A process of boosting the voltage is required when a voltage that is generated by the power supply 100 is low. For example, the booster circuit 200 is a booster converter.

The apparatus 300 for controlling a booster circuit adjusts a duty ratio of the booster circuit 200, such as by adjusting a duty ratio of a switching device included in the booster circuit 200.

The load 400 is, for example, a battery.

Figure 2:
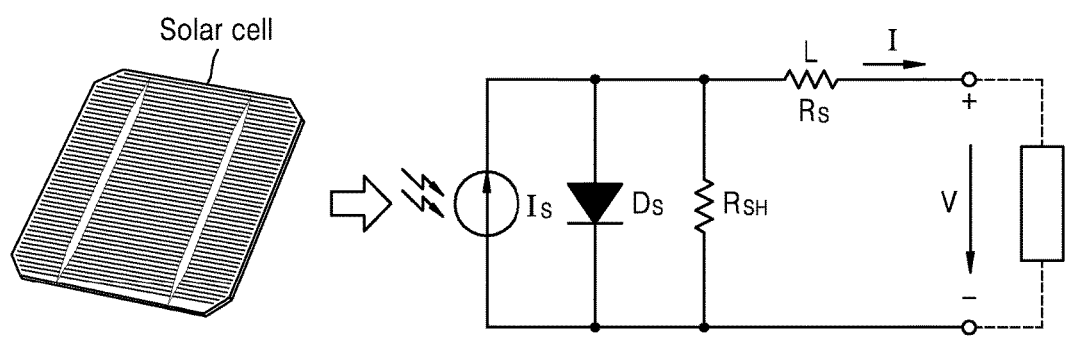
FIG. 2 illustrates, when a power supply is a solar cell, an electrical circuit model of the solar cell.

FIG. 2 illustrates, when the power supply 100 is a solar cell, an electrical circuit model of the solar cell.

Referring to FIG. 2, an electrical circuit model of a solar cell is composed of a current source $I_S$, a diode $D_S$, and resistances $R_S$ and $R_{SH}$. Power generated by the electrical circuit model of a solar cell is determined by voltage V and current I generated by the electrical circuit model of a solar cell.

A solar cell includes a junction of a p-type semiconductor and an n-type semiconductor and, therefore, has non-linear properties of a p-n diode. In other words, with a solar cell, a graph of power according to voltage V has an asymmetric shape. On the contrary, with a ThermoElectric Generator (TEG), a graph of power according to voltage has a symmetric shape and thus, maximum power is extracted with half an open circuit voltage. Accordingly, unlike the TEG, the solar cell requires monitoring power in order to extract maximum power.

If the power supply 100 has non-linear properties, such as the solar cell, in order to extract maximum power from the power supply 100, power that is generated by the power supply 100 should be monitored and controlled such that maximum power is extracted. However, when voltage and current that are output from the power supply 100 are detected to monitor the power generated by the power supply 100, there is a problem that a circuit from which the voltage and the current are detected consumes a large amount of power. Hereinafter, an apparatus 10 for extracting maximum power which has maximum power extracted from the power supply 100 while having power consumption for monitoring the power generated by the power supply 100 reduced will be described.

Figure 3:
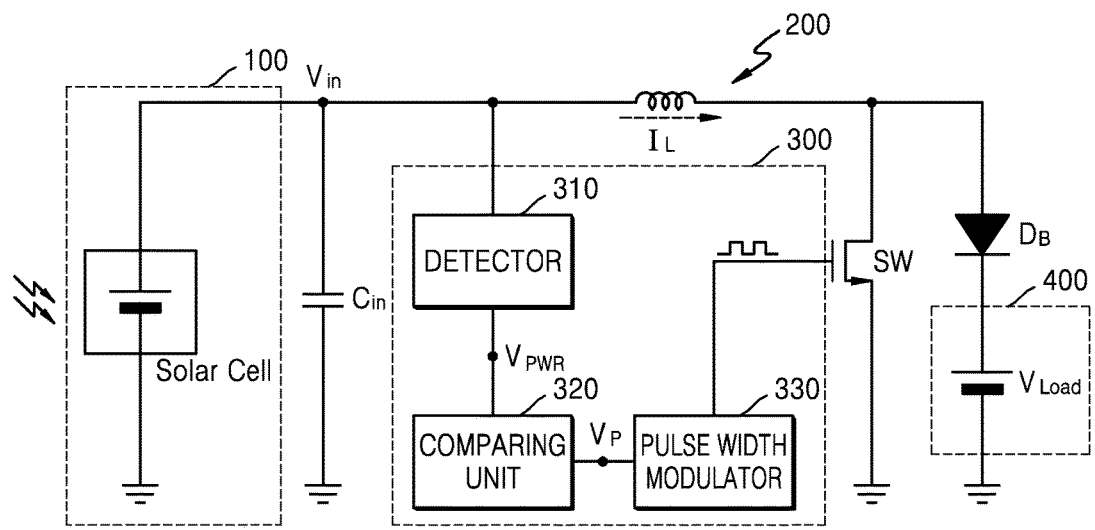
FIG. 3 illustrates circuit configuration and connection of an apparatus for extracting maximum power according to an embodiment of the present invention.

FIG. 3 illustrates circuit configuration and connection of an apparatus 10 for extracting maximum power according to an embodiment of the present invention.

Referring to FIG. 3, a booster circuit 200 is connected between a power supply 100 and a load 400, and the booster circuit 200 is controlled by an apparatus 300 for controlling a booster circuit. One of ordinary skill in the art will appreciate that the apparatus 10 for extracting maximum power may include other general-purpose components alternatively or in addition to the components of FIG. 3.

FIG. 3 illustrates when the power supply 100 is a solar cell and the booster circuit 200 is a booster converter will be described as an example.

The solar cell that is the power supply 100 generates electrical energy from solar energy. Power that is generated by the solar cell is affected by such factors as intensity of the solar energy and temperature of the solar cell. When voltage that is generated by the solar cell is lower than voltage that is required to use an electronic device, the voltage generated by the solar cell is boosted to a sufficient voltage level.

The booster converter that is the booster circuit 200 boosts an input voltage and outputs the boosted voltage to the load 400. As shown in FIG. 3, the booster converter includes a capacitor $C_{in}$, an inductor L, a switching device SW, and a diode $D_B$. The diode $D_B$ is replaced with another switching device. The switching device SW may be a Metal-Oxide-Semiconductor Field-Effect Transistor (MOSFET), and is switched by a pulse that is input to a gate terminal.

An input impedance of the booster converter is controlled by a duty ratio of a pulse that is input to the switching device SW such that maximum power is extracted from the solar cell that is the power supply 100. For this, the duty ratio of a pulse that is input to the switching device SW should be determined by monitoring power that is generated by the power supply 100.

When the booster converter that is the booster circuit 200 operates in a Discontinuous Conduction Mode (DCM), current which flows through the inductor L repeatedly flows and falls to zero according to the duty ratio of a pulse that is input to the switching device SW, as will now be described.

Figure 4:
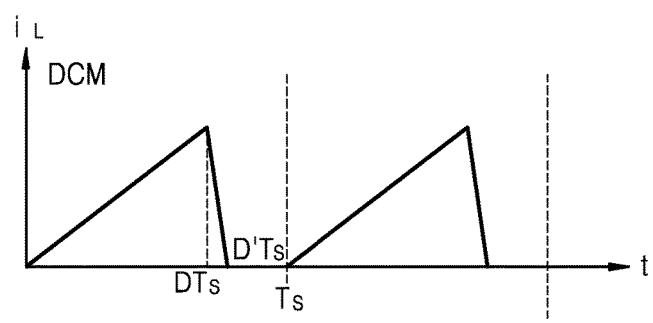
FIG. 4 illustrates, when a booster circuit operates in a discontinuous conduction mode (DCM) in an apparatus for extracting maximum power according to an embodiment, current which flows through an inductor by voltage that is input to the booster circuit.

FIG. 4 illustrates, when a booster circuit 200 operates in a DCM in an apparatus 10 for extracting maximum power according to an embodiment of the present invention, current which flows through an inductor by voltage that is input to the booster circuit 200.

Referring to FIG. 4, a current $i_L$ flowing through an inductor L of a boost converter that is the booster circuit 200 is discontinuous. In detail, the current $i_L$ continues to increasingly flow until a time $D \cdot T_S$. Thereafter, the current $i_L$ becomes a value of '0' in a very short time of $D' \cdot T_S$ and thus no longer flows. Assuming that the time $D \cdot T_S$ is very long compared to $D' \cdot T_S$, a power $P_{in}$ generated by a power supply 100 over an interval corresponding to a period $T_S$ is calculated using Equation (1), as follows.

$$P_{in} = \frac{1}{T_S} \int_0^{D \cdot T_S} V_{in} \times i_L dt, \ i_L = \frac{V_{in}}{L} \times t \qquad (1)$$
$$= \frac{1}{T_S} \int_0^{D \cdot T_S} \frac{V_{in}^2}{L} \times t\, dt$$

-continued $$= \frac{V_{in}^2}{T_S \cdot L} \int_0^{D \cdot T_S} t\,dt$$

$$= \frac{V_{in}^2}{T_S \cdot L} \times \frac{1}{2}(D \cdot T_S)^2$$

$$= \frac{T_S}{2L}(D \cdot V_{in})^2$$

In Equation (1), $V_{in}$ is a voltage that is input to the booster circuit 200, and D is a duty ratio of the booster circuit 200. Equation (1) is expressed again as an equation regarding multiplication of the voltage $V_{in}$ that is input to the booster circuit 200 and the duty ratio D of the booster circuit 200 using Equation (2), as follows.

$$D \cdot V_{in} = \sqrt{\frac{P_{in} \cdot 2L}{T_S}} = \sqrt{P_{in} \cdot 2L \cdot f_S} \quad (2)$$

In Equation (2), $f_S$, as a frequency, is a reciprocal of the period $T_S$.

Referring to Equation (2), a square root of the power $P_{in}$ generated by the power supply 100 is proportional to a value obtained by multiplying the voltage $V_{in}$ that is input to the booster circuit 200 from the power supply 100 by the duty ratio D of the booster circuit 200. Accordingly, the value obtained by multiplying the voltage $V_{in}$ that is input to the booster circuit 200 from the power supply 100 by the duty ratio D of the booster circuit 200 is information regarding the power $P_{in}$ generated by the power supply 100.

Referring back to FIG. 3, the apparatus 300 for controlling a booster circuit determines a duty ratio of a pulse that switches the switching device SW included in the booster circuit 200 and thus outputs a pulse having the determined duty ratio to the switching device SW included in the booster circuit 200. As shown in FIG. 3, the apparatus 300 for controlling a booster circuit includes a detector 310, a comparing unit 320, and a pulse width modulator 330. Such components of the apparatus 300 for controlling a booster circuit determine a duty ratio of the booster circuit 200 extracting maximum power from the power supply 100, and for this, monitor information regarding power that is generated by the power supply 100.

While operating a booster converter that is the booster circuit 200 in the DCM, the apparatus 300 for controlling a booster circuit controls a duty ratio of a pulse that is input to the switching device SW of the booster converter such that an input impedance of the booster converter extracts maximum power from a solar cell that is the power supply 100. For this, the apparatus 300 for controlling a booster circuit is required to monitor information regarding power generated by the power supply 100.

Figure 5:
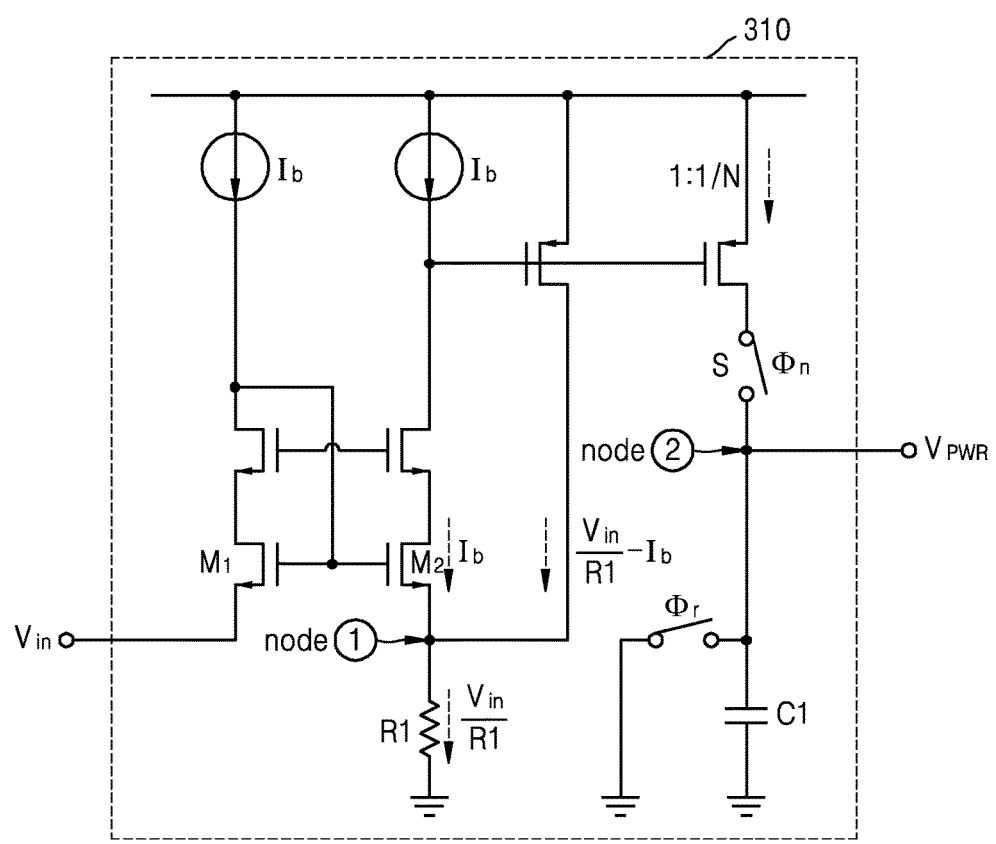
FIG. 5 illustrates a circuit for a detector of an apparatus for controlling a booster circuit according to an embodiment of the present invention.

The value obtained by multiplying the voltage $V_{in}$ that is input to the booster circuit 200 from the power supply 100 by the duty ratio D of the booster circuit 200 is information regarding the power $P_{in}$ generated by the power supply 100. Accordingly, when there is a circuit which generates and outputs the value obtained by multiplying the voltage $V_{in}$ that is input to the booster circuit 200 from the power supply 100 by the duty ratio D of the booster circuit 200, the information regarding the power $P_{in}$ generated by the power supply 100 is monitored by using the output. FIG. 5 illustrates a circuit for a detector 310 of an apparatus 300 for controlling a booster circuit according to an embodiment of the present invention. One of ordinary skill in the art related to the present invention will appreciate that the detector 310 may include other general-purpose components alternatively or in addition to the components of FIG. 5.

The detector 310 receives input of a voltage $V_{in}$ that is input to a booster circuit 200 and thus outputs a first output voltage $V_{PWR}$. In detail, the detector 310 is a circuit that receives input of the voltage $V_{in}$ that is input to the booster circuit 200, a pulse $\Phi_n$ which includes a pulse interval having a normal duty ratio that is a duty ratio of a present booster circuit 200, and a pulse interval having a perturbation duty ratio with respect to the duty ratio of the present booster circuit 200, and thus generates a value obtained by means of a circuit by multiplying the voltage $V_{in}$ that is input to the booster circuit 200 by a duty ratio D that is applied to a predetermined interval of the pulse $\Phi_n$. Thereby, the first output voltage $V_{PWR}$ is outputted reflecting the value obtained by multiplying the voltage $V_{in}$ by the duty ratio D. In other words, the detector 310 detects the first output voltage $V_{PWR}$ including information regarding power that is generated by a power supply 100.

Referring to the top of the circuit shown in FIG. 5, there are four branches in total from left to right, and will be sequentially referred to as a first branch, a second branch, a third branch, and a fourth branch. A current source through which a current $I_b$ flows respectively in the first branch and the second branch exists. Only the current $I_b$ flows through a branch that is connected to the current source through which the current $I_b$ flows. Accordingly, when the voltage $V_{in}$ that is input to the booster circuit 200 is applied to a source terminal of a MOSFET $M_1$ that is positioned at the bottom of the first branch, as the voltage $V_{in}$ that is input to the booster circuit 200 changes, a gate-source voltage of the MOSFET $M_1$ changes. That is, the change in the voltage $V_{in}$ that is input to the booster circuit 200 affects a gate terminal of the MOSFET $M_1$.

The gate terminal of the MOSFET $M_1$ is connected to a gate terminal of another MOSFET $M_2$ and therefore, the change in the voltage $V_{in}$ that is input to the booster circuit 200 ultimately affects the gate terminal of the other MOSFET $M_2$. Since only the current $I_b$ flows through the second branch that is connected to the current source through which the current $I_b$ flows, a voltage change of the gate terminal of the MOSFET $M_2$ causes a voltage change of a source terminal of the MOSFET $M_2$. Thus, a gate-source voltage of the MOSFET $M_2$ is maintained.

The voltage change of a source terminal of the MOSFET $M_2$, that is, a voltage change of node ①, causes a change in a current $$\frac{V_{in}}{R_1}$$

which flows through a resistance R1. In other words, a voltage of the node ① is identical to the voltage $V_{in}$ that is input to the booster circuit 200 by negative feedback. Therefore, a change in the voltage $V_{in}$ that is input to the booster circuit 200 may cause a change in the current $$\frac{V_{in}}{R_1}$$

which flows through the resistance R1.

Since the MOSFET $M_2$ is connected to the current source through which the current $I_b$ flows, a current $$\frac{V_{in}}{R_1} - I_b$$

flows through the third branch. Current that is copied to be $$\frac{1}{N}$$

times the current $$\frac{V_{in}}{R_1},$$

which flows through the third branch, flows through the fourth branch.

A switching device S in the detector 310 is switched by a pulse including intervals to which different duty ratios are applied. For example, the switching device S in the detector 310 is switched by a pulse $\Phi_n$ including an interval of a normal duty ratio of a present booster circuit 200 and an interval of a perturbation duty ratio with respect to the duty ratio of the present booster circuit 200. The perturbation duty ratio is greater than or less than the normal duty ratio by a predetermined value. When a current which flows through a capacitor C1 is integrated over an interval having a value of D as a duty ratio, the first output voltage $V_{PWR}$ is expressed using Equation (3), as follows.

$$V_{PWR} = \frac{D}{N}\left(\frac{V_{in}}{R_1} - I_b\right) \quad (3)$$

$$= \left(\frac{1}{N \times R_1}\right) \times (V_{in} \times D) - \left(\frac{D \times I_b}{N}\right)$$

$$= K \times (V_{in} \times D) - V_{offset}$$

In Equation (3), K is a constant, and an offset voltage $V_{offset}$ is also a constant. The first output voltage $V_{PWR}$ is a value that includes the value obtained by multiplying the voltage $V_{in}$ that is input to the booster circuit 200 by the duty ratio D related to a duty ratio of the booster circuit 200. In other words, the first output voltage $V_{PWR}$ includes information regarding power $P_{in}$ that is generated by the power supply 100. Accordingly, the detector 310 obtains the information regarding power $P_{in}$ generated by the power supply 100 by detecting the first output voltage $V_{PWR}$.

When a duty ratio of the booster circuit 200 changes, the first output voltage $V_{PWR}$ is reset by a reset signal $\Phi_r$ such that the first output voltage $V_{PWR}$ according to the changed duty ratio is detected.

The first output voltage $V_{PWR}$ detected from the detector 310 is input to a comparing unit 320, which will be described in detail with reference to FIG. 6 as follows.

Figure 6:
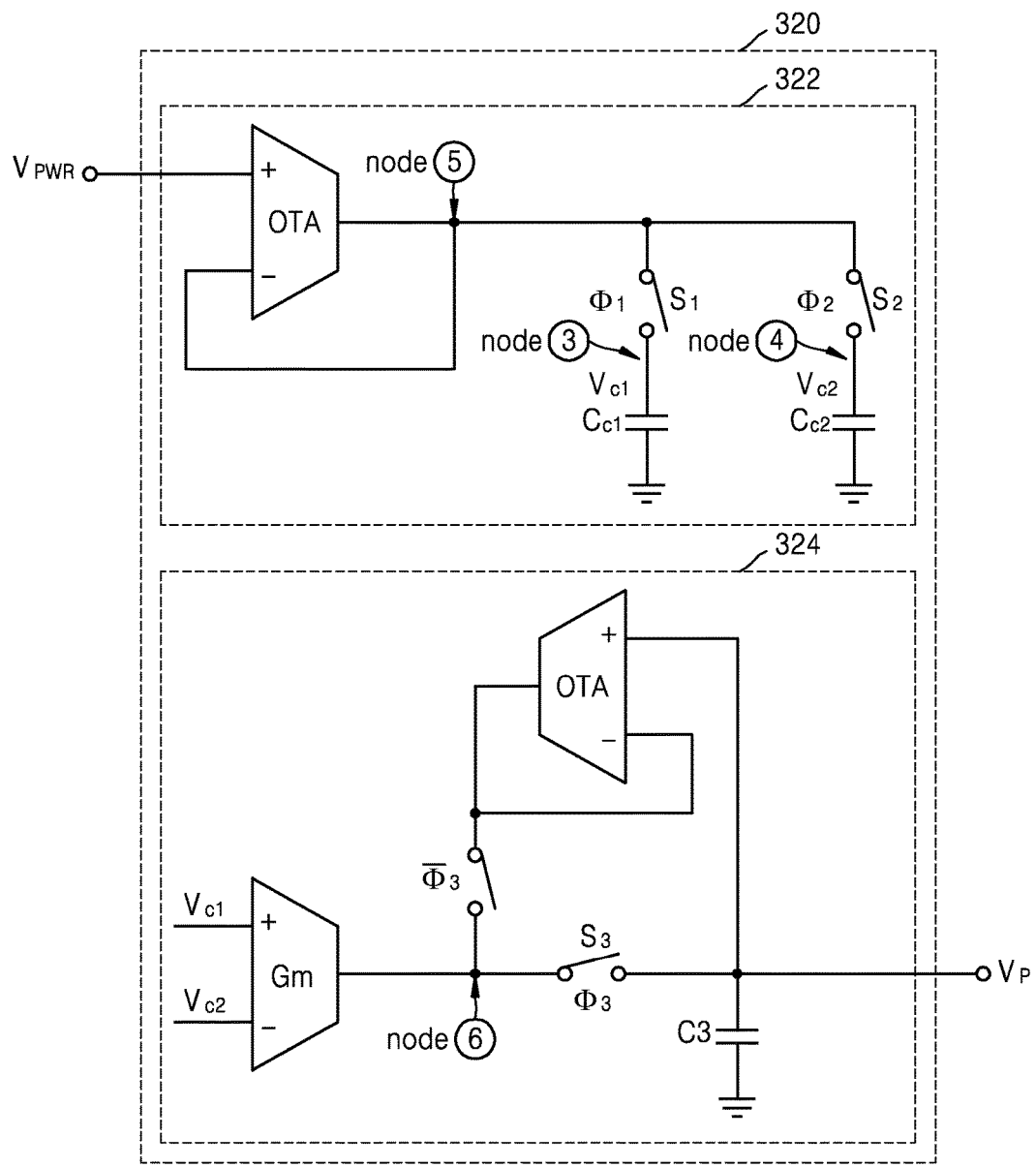
FIG. 6 illustrates a circuit for a comparing unit of an apparatus for controlling a booster circuit according to an embodiment of the present invention.

FIG. 6 illustrates a circuit for a comparing unit 320 of an apparatus 300 for controlling a booster circuit according to an embodiment of the present invention. One of ordinary skill in the art will appreciate that the comparing unit 320 may include other general-purpose components alternatively or in addition to the components of FIG. 6.

The comparing unit 320 receives input of a first output voltage $V_{PWR}$ that is detected from a detector 310, and outputs a second output voltage $V_P$. In detail, the comparing unit 320 adjusts the second output voltage $V_P$ determining a duty ratio of a booster circuit 200 according to a comparison result by comparing voltage values to which different duty ratios are applied in the first output voltage $V_{PWR}$, and thus, outputs the second output voltage $V_P$.

Referring to the circuit shown in FIG. 6, the comparing unit 320 is mainly divided into a comparison voltage obtaining unit 322 and a voltage adjusting unit 324.

From the first output voltage $V_{PWR}$ detected from the detector 310, the comparison voltage obtaining unit 322 respectively obtains a first comparison voltage $V_{C1}$ to which a normal duty ratio that is a duty ratio of a present booster circuit 200 is applied and a second comparison voltage $V_{C2}$ to which a perturbation duty ratio with respect to the duty ratio of the present booster circuit 200 is applied.

In detail, since the first output voltage $V_{PWR}$ detected from the detector 310 is input to a '+' terminal of an Operational Transconductance Amplifier (OTA) which is a type of unit gain buffer and a '−' terminal of the OTA is connected to node ⑤ which is an output terminal of the OTA, the node ⑤ has a value of the first output voltage $V_{PWR}$. The comparison voltage obtaining unit 322 obtains a first comparison voltage $V_{C1}$ by integrating a current which flows through a first capacitor $C_{C1}$ due to the first output voltage $V_{PWR}$ over an interval to which the normal duty ratio is applied and obtains a second comparison voltage $V_{C2}$ by integrating a current which flows through a second capacitor $C_{C2}$ due to the first output voltage $V_{PWR}$ over an interval to which the perturbation duty ratio is applied. $\Phi_1$ is a signal that is input to a switching device $S_1$ in order to extract the first output voltage $V_{PWR}$ of the interval to which the normal duty ratio is applied, and $\Phi_2$ is a signal that is input to another switching device $S_2$ in order to extract the first output voltage $V_{PWR}$ of the interval to which the perturbation duty ratio is applied. The signals $\Phi_1$ and $\Phi_2$ are input in consideration of a pulse $\Phi_n$ including intervals to which different duty ratios are applied.

The first comparison voltage $V_{C1}$ and the second comparison voltage $V_{C2}$ are obtained by respectively accumulating the first comparison voltage $V_{C1}$ and the second comparison voltage $V_{C2}$ a plurality of times after a voltage $V_{in}$ that is input to a booster circuit 200 from a power supply 100 converges to a predetermined value. Based on the second output voltage $V_P$, when a duty ratio of the booster circuit 200 changes, the voltage $V_{in}$ that is input to the booster circuit 200 also changes. Thus, some time may elapse until the voltage $V_{in}$ converges to the predetermined value. A process of obtaining the first comparison voltage $V_{C1}$ and the second comparison voltage $V_{C2}$ is accumulated a plurality of times to reduce the influence of noise, in other words, to reduce errors when the first comparison voltage $V_{C1}$ and the second comparison voltage $V_{C2}$ are obtained.

The first capacitor $C_{C1}$ stores information regarding power $P_{in}$ that is generated by the power supply 100 when of the normal duty ratio as the first comparison voltage $V_{C1}$, and the second capacitor $C_{C2}$ stores information regarding power $P_{in}$ that is generated by the power supply 100 when of the perturbation duty ratio as the second comparison voltage $V_{C2}$. The first comparison voltage $V_{C1}$ and the second comparison voltage $V_{C2}$ are input to the voltage adjusting unit 324.

By comparing the first comparison voltage $V_{C1}$ of node ③ and the second comparison voltage $V_{C2}$ of node ④, the voltage adjusting unit 324 adjusts a level of the second output voltage $V_P$ determining the duty ratio of the booster circuit 200 according to a comparison result. That is, the voltage adjusting unit 324 compares the two voltage values and thus adjusts the level of the second output voltage $V_P$ so as to follow a duty ratio of a voltage having a higher power. For example, when the first comparison voltage $V_{C1}$ is greater than the second comparison voltage $V_{C2}$, the level of the second output voltage $V_P$ is increased. When the second comparison voltage $V_{C2}$ is greater than the first comparison voltage $V_{C1}$, the level of the second output voltage $V_P$ is decreased.

As shown in FIG. 6, the first comparison voltage VC1 of node ③ and the second comparison voltage $V_{C2}$ of node ④ is respectively input to a '+' terminal and a '−' terminal of a comparator $G_m$. When the first comparison voltage $V_{C1}$ is greater than the second comparison voltage $V_{C2}$, the comparator $G_m$ supplies current to a capacitor C3 and thus increases the level of the second output voltage $V_P$. When the second comparison voltage $V_{C2}$ is greater than the first comparison voltage $V_{C1}$, the comparator $G_m$ releases current from the capacitor C3 and thus decreases the level of the second output voltage $V_P$.

The level of the second output voltage $V_P$ may also be adjusted by terminal positions of the comparator $G_m$ to which the first comparison voltage $V_{C1}$ and the second comparison voltage $V_{C2}$ are input and a modified circuit according to addition of an inverter device.

The OTA of the voltage adjusting unit 324 is a circuit for maintaining the second output voltage $V_P$ by means of a voltage of node ⑥ when a switching device $S_3$ is open. When the switching device $S_3$ is closed by a signal $\Phi_3$ that commands a renewal of the second output voltage $V_P$, the second output voltage $V_P$ is renewed.

Referring back to FIG. 3, the pulse width modulator 330 adjusts the duty ratio of the booster circuit 200 based on the adjusted second output voltage $V_P$. Although not shown, the pulse width modulator 330 includes a comparator, a pulse pattern generator, a Set-Reset (SR) flip-flop.

The pulse width modulator 330 receives input of the second output voltage $V_P$ adjusted by the comparing unit 320, and thus outputs a pulse having an adjusted duty ratio of the booster circuit 200. For example, when a voltage of the second output voltage $V_P$ that is input to the pulse width modulator 330 increases, the duty ratio is increased. If the voltage of the second output voltage $V_P$ that is input to the pulse width modulator 330 decreases, the duty ratio is decreased.

By repeating the above process in the apparatus 300 for controlling a booster circuit, the second output voltage $V_P$ converges to a predetermined value such that the duty ratio of the booster circuit 200 becomes a duty ratio that extracts maximum power from the power supply 100. That is, as the second output voltage $V_P$ converges to the predetermined value, the duty ratio of the booster circuit 200 converges to a duty ratio extracting maximum power from the power supply 100.

Figure 7:
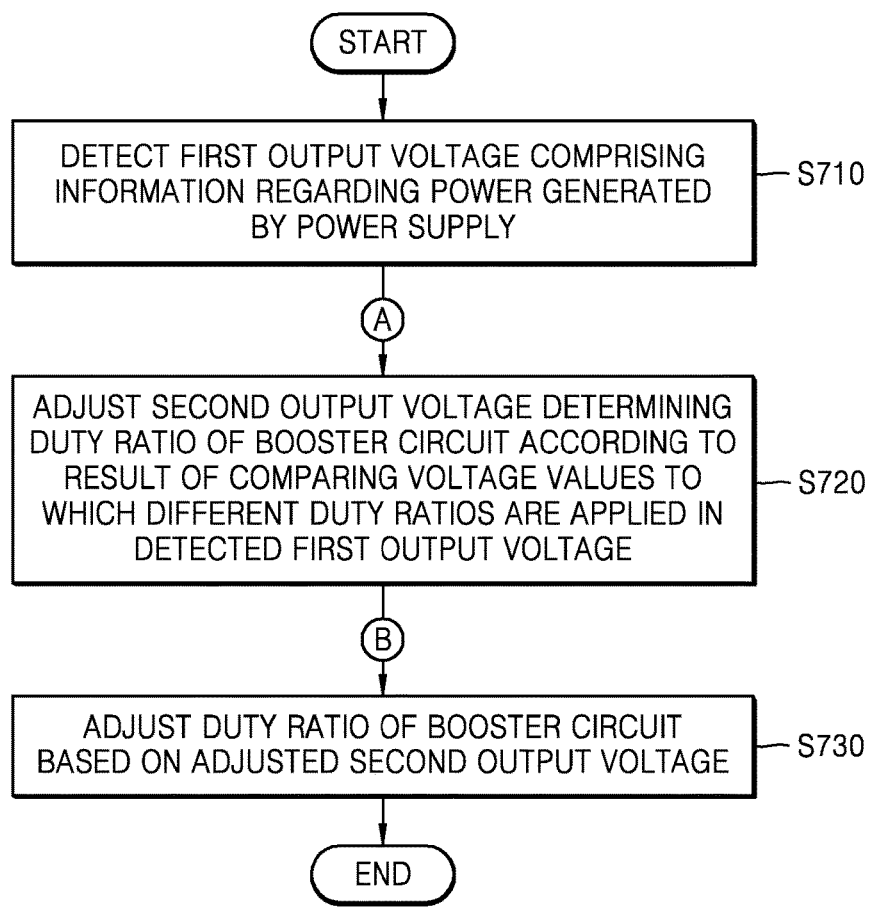
FIG. 7 is a flowchart of a method of controlling a booster circuit according to an embodiment of the present invention.

FIG. 7 is a flowchart of a method of controlling a booster circuit according to an embodiment of the present invention. Hereinafter, although omitted, the above descriptions of the apparatus 300 for controlling a booster circuit may also be applied to the method of controlling a booster circuit.

In step S710, the apparatus 300 for controlling a booster circuit detects a first output voltage including information regarding power that is generated by a power supply 100, which information is a value obtained by multiplying a voltage that is input to a booster circuit 200 from the power supply 100 by a duty ratio of the booster circuit 200.

In step S720, the apparatus 300 for controlling a booster circuit adjusts a second output voltage which determines a duty ratio of a booster circuit according to a comparison result by comparing voltage values to which different duty ratios are applied in the detected first output voltage.

Figure 8:
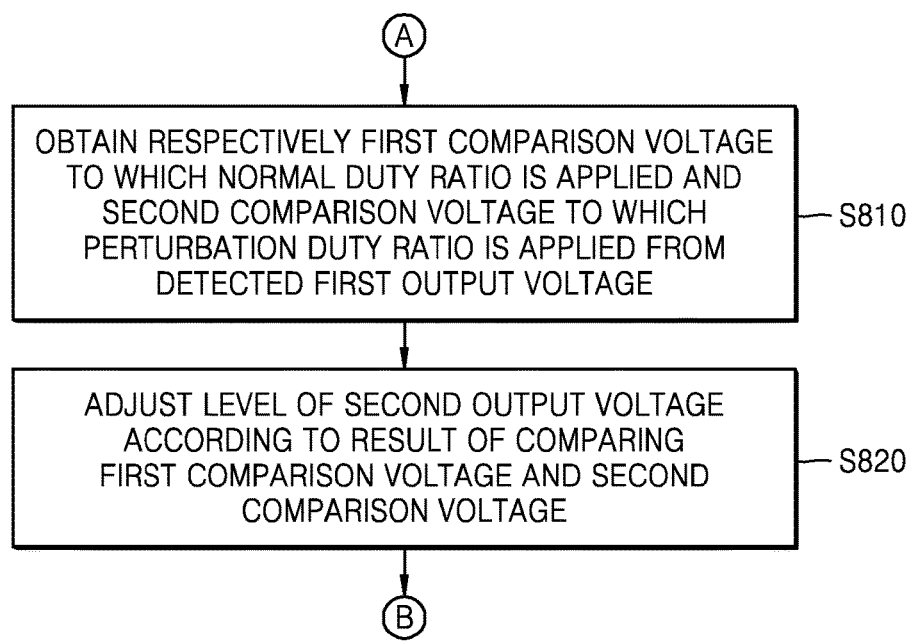
FIG. 8 is a detailed flowchart that illustrates adjusting a second output voltage in a method of controlling a booster circuit according to an embodiment of the present invention.

FIG. 8 is a detailed flowchart that illustrates adjusting a second output voltage in a method of controlling a booster circuit according to an embodiment of the present invention.

In step S810, from the detected first output voltage, an apparatus 300 for controlling a booster circuit respectively obtains a first comparison voltage to which a normal duty ratio that is a duty ratio of a present booster circuit 200 is applied and a second comparison voltage to which a perturbation duty ratio with respect to the duty ratio of the present booster circuit 200 is applied. For example, the apparatus 300 for controlling a booster circuit obtains a first comparison voltage by integrating a current which flows through a first capacitor due to the detected first output voltage over an interval to which the normal duty ratio is applied and obtains a second comparison voltage by integrating a current which flows through a second capacitor due to the detected first output voltage over an interval to which the perturbation duty ratio is applied. The first comparison voltage and the second comparison voltage are obtained by respectively accumulating the first comparison voltage and the second comparison voltage a plurality of times after a voltage that is input to a booster circuit 200 from a power supply 100 converges to a predetermined value.

In step S820, the apparatus 300 for controlling a booster circuit adjusts a level of the second output voltage according to a comparison result by comparing the first comparison voltage and the second comparison voltage. For example, when the first comparison voltage is greater than the second comparison voltage, the level of the second output voltage is increased. When the second comparison voltage is greater than the first comparison voltage, the level of the second output voltage is decreased.

Referring back to FIG. 7, in step S730, the apparatus 300 for controlling a booster circuit adjusts a duty ratio of the booster circuit 200 based on the adjusted second output voltage. As the adjusted second output voltage converges to a predetermined value, the adjusted duty ratio of the booster circuit 200 converges to a duty ratio extracting maximum power from the power supply 100.

As described above, according to embodiments of the present invention, maximum power is extracted from a power supply while power consumption for power monitoring is reduced.

While one or more embodiments have been described with reference to the figures, it will be understood by those of ordinary skill in the art that various changes in form and details may be made therein without departing from the spirit and scope of the inventive concept as defined by the appended claims. The embodiments should be considered in a descriptive sense only and not for purposes of limitation. Therefore, the scope of the inventive concept is defined not by the detailed description but by the appended claims and their equivalents, and all differences within the scope will be construed as being included in the inventive concept.

What is claimed is:

1. An apparatus for controlling a booster circuit which is connected to a power supply, the apparatus comprising:
   a detector that receives a first input voltage and generates a first output voltage related to power that is generated by the power supply;
   a comparing circuit that generates a second output voltage which determines a duty ratio of the booster circuit, and adjusts the generated second output voltage by comparing a first comparison voltage which is obtained by applying a duty ratio of a present booster circuit to the generated first output voltage, to a second comparison voltage which is obtained by applying a perturbation duty ratio with respect to the duty ratio of the present booster circuit to the generated first output voltage; and a pulse width modulator that adjusts the duty ratio of the booster circuit based on the adjusted second output voltage, wherein the detector generates the first output voltage by multiplying the first input voltage that is input to the booster circuit from the power supply by the duty ratio of the booster circuit.

2. The apparatus of claim 1, wherein, as the adjusted second output voltage converges to a predetermined value, the adjusted duty ratio of the booster circuit converges to a duty ratio that extracts maximum power from the power supply.

3. The apparatus of claim 1, wherein the comparing unit comprises:
a comparison voltage obtaining unit that respectively obtains the first comparison voltage and the second comparison voltage; and
a voltage adjusting unit that adjusts a level of the second output voltage according to the result of comparing the first comparison voltage and the second comparison voltage.

4. The apparatus of claim 3, wherein the comparison voltage obtaining unit obtains the first comparison voltage by integrating a current which flows through a first capacitor due to the detected first output voltage over an interval to which the normal duty ratio is applied and obtains the second comparison voltage by integrating a current which flows through a second capacitor due to the detected first output voltage over an interval to which the perturbation duty ratio is applied.

5. The apparatus of claim 4, wherein the first comparison voltage and the second comparison voltage are obtained by respectively accumulating the first comparison voltage and the second comparison voltage a plurality of times after a voltage that is input to the booster circuit from the power supply converges to a predetermined value.

6. The apparatus of claim 3, wherein the voltage adjusting unit increases the level of the second output voltage when the first comparison voltage is greater than the second comparison voltage and decreases the level of the second output voltage when the second comparison voltage is greater than the first comparison voltage.

7. A method of controlling a booster circuit which is connected to a power supply, the method comprising:
receiving a first input voltage and generating a first output voltage related to power that is generated by the power supply;
generating a second output voltage which determines a duty ratio of the booster circuit and adjusts the generated second output voltage by comparing a first comparison voltage which is obtained by applying a duty ratio of a present booster circuit to the generated first output voltage, to a second comparison voltage which is obtained by applying a perturbation duty ratio with respect to the duty ratio of the present booster circuit to the generated first output voltage; and
adjusting the duty ratio of the booster circuit based on the adjusted second output voltage,
wherein the detector generates the first output voltage by multiplying the first input voltage that is input to the booster circuit from the power supply by the duty ratio of the booster circuit.

8. The method of claim 7, wherein, as the adjusted second output voltage converges to a predetermined value, the adjusted duty ratio of the booster circuit converges to a duty ratio that extracts maximum power from the power supply.

9. The method of claim 7, wherein adjusting the second output voltage comprises:
respectively obtaining the first comparison voltage and the second comparison voltage; and
adjusting a level of the second output voltage according to the result of comparing the first comparison voltage and the second comparison voltage.

10. The method of claim 9, wherein the first comparison voltage is obtained by integrating a current which flows through a first capacitor due to the detected first output voltage over an interval to which the normal duty ratio is applied, and the second comparison voltage is obtained by integrating a current which flows through a second capacitor due to the detected first output voltage over an interval to which the perturbation duty ratio is applied.

11. The method of claim 10, wherein the first comparison voltage and the second comparison voltage are obtained by respectively accumulating the first comparison voltage and the second comparison voltage a plurality of times after a voltage that is input to the booster circuit from the power supply converges to a predetermined value.

12. The method of claim 9, wherein adjusting the level of the second output voltage comprises increasing the level of the second output voltage when the first comparison voltage is greater than the second comparison voltage and decreasing the level of the second output voltage when the second comparison voltage is greater than the first comparison voltage.

13. An apparatus for extracting maximum power, the apparatus comprising:
a power supply that generates power;
a booster circuit that boosts voltage that is input from the power supply; and
a controller that controls the booster circuit by adjusting a duty ratio of the booster circuit,
wherein the controller determines the duty ratio of the booster circuit by comparing a first comparison voltage which is obtained by applying a duty ratio of a present booster circuit to a first output voltage that is generated in relation to power that is generated by the power supply, to a second comparison voltage which is obtained by applying a perturbation duty ratio with respect to the duty ratio of the present booster circuit to the generated first output voltage, generating a second output voltage as a result of the comparing, and adjusting the duty ratio of the booster circuit based on the second output voltage, and
wherein the first output voltage is generated by multiplying the voltage that is input to the booster circuit from the power supply by the duty ratio of the booster circuit.

* * * * *